(12) United States Patent
Eriksson et al.

(10) Patent No.: US 6,739,607 B2
(45) Date of Patent: May 25, 2004

(54) DEVICE FOR DAMPING PIVOTAL MOVEMENTS OF A WHEEL-SUPPORTING PENDULAR ARM OF A MOTOR VEHICLE

(75) Inventors: Claes Eriksson, Arnäsvall (SE); Anders Bodin, Örnsköldsvik (SE)

(73) Assignee: Alvis Hagglunds AB, Ornskoldsvik (SE)

( * ) Notice: Subject to any disclaimer, the term of this patent is extended or adjusted under 35 U.S.C. 154(b) by 135 days.

(21) Appl. No.: 10/048,849

(22) PCT Filed: Jun. 1, 2001

(86) PCT No.: PCT/SE01/01203
§ 371 (c)(1),
(2), (4) Date: Feb. 6, 2002

(87) PCT Pub. No.: WO01/94190
PCT Pub. Date: Dec. 13, 2001

(65) Prior Publication Data
US 2002/0113395 A1 Aug. 22, 2002

(30) Foreign Application Priority Data
Jun. 6, 2000 (SE) .............................................. 0002104

(51) Int. Cl.⁷ .............................................. B62D 55/104
(52) U.S. Cl. .......................... 280/124.129; 280/124.13; 188/71.5; 188/294
(58) Field of Search ................... 280/124.128, 124.129, 280/124.13, 124.157, 124.16, 124.161, 124.162; 188/71.3, 71.5, 290, 293, 294, 306, 308; 464/26, 37, 38, 46; 180/9.5, 9.54

(56) References Cited
U.S. PATENT DOCUMENTS 3,262,522 A    7/1966   Johnson et al.
3,946,837 A *  3/1976   Houser ...................... 188/72.4
4,447,073 A    5/1984   Brandstadter
4,532,827 A *  8/1985   Beim .......................... 74/745
4,624,650 A   11/1986   Hiruma et al.
4,667,527 A *  5/1987   Ehrlinger et al. .......... 74/411.5
4,718,305 A *  1/1988   Umemoto .................... 475/143
4,721,327 A *  1/1988   Chauveau et al. ..... 280/124.129
5,178,405 A *  1/1993   Brandstadter ............ 280/5.515
5,855,518 A *  1/1999   Tanaka et al. ................ 464/38

FOREIGN PATENT DOCUMENTS

DE  1 961 008       6/1971
DE  26 29 816       1/1978
EP  0 485 844 A2    5/1992
GB  1 282 377       7/1972

* cited by examiner

*Primary Examiner*—David R. Dunn
(74) *Attorney, Agent, or Firm*—Young & Thompson

(57) ABSTRACT

A device for position and speed-dependent damping of pivotal movements of a wheel-supporting pendular arm of a motor vehicle, includes a housing (16) with a cavity for rotatable support of a swing axle of the pendular arm; a plate pack arranged in the housing; a first annular pressure disk, torsionally fixed but axially moveable on the swing axle of the pendular arm; a second annular pressure plate, torsionally fixed but axially moveable in the housing, the two pressure plates having opposing sides with members designed, on rotation of the first pressure plate, to produce an axial movement of the pressure plates relative to one another; and a compression spring unit, designed to exert a compressive force on the pressure plates and on the plate pack.

20 Claims, 4 Drawing Sheets

DEVICE FOR DAMPING PIVOTAL MOVEMENTS OF A WHEEL-SUPPORTING PENDULAR ARM OF A MOTOR VEHICLE

TECHNICAL FIELD

The present invention relates to a device for damping pivotal movements of a wheel-supporting pendular arm of a motor vehicle. The invention relates especially to such a device for both position and speed-dependent damping of pivotal movements of wheel-supporting pendular arms of a tracked motor vehicle.

PRIOR ART

DE-A-1 961 008 has previously disclosed a springing and damping device for damping pivotal movements of a wheel-supporting pendular arm of a tracked vehicle, the device comprising a housing with a cavity for rotatable support of a swing axle of the pendular arm; a plate pack arranged in the housing and comprising a number of coaxially adjoining, annular disk plates, which are alternately torsionally fixed but axially moveable in the housing or on the swing axle; a first annular pressure disk torsionally fixed but axially moveable on the swing axle of the pendular arm; a second annular pressure plate, torsionally fixed but axially moveable in the housing, the two pressure plates having opposing sides with members designed, on rotation of the first pressure plate, to produce an axial movement of the pressure plates in relation to one another; and compression spring unit, designed to exert a compressive force on the pressure plates and the disk plates. Springing movements of the pendular arm are permitted by a torsion bar, to which the pendular arm is connected, whilst a position-dependent damping of compressive springing movements of the pendular arm is achieved in that friction disk plates are pressed against one another and against a brake disk in the housing through the action of the compression spring unit, when the pressure disks are separated from one another by means of interacting wedge elements in compressive springing of the pendular arm.

In extreme off-road driving conditions of a tracked vehicle with such a springing and damping system, bottoming easily occurs unless the system is of very rigid design, which has an adverse affect on comfort in ordinary road driving conditions.

OBJECT OF THE INVENTION

An object of the invention is to produce an improved device for damping pivotal movements of the wheel-supporting pendular arms of a tracked vehicle, which device will permit both position-dependent and speed-dependent damping of the pendular arms in the case of compressive springing and position-dependent damping in the case of extension springing in order to produce a good, comfortable springing and damping function both in ordinary driving of the vehicle on roads and in extreme off-road driving conditions.

SOLUTION ACCORDING TO THE INVENTION

With this object in view, the aforementioned device according to the invention is characterized in that it comprises an axially moveable piston, arranged between the compression spring unit and the pressure plates, and a restrictor element, which allows a hydraulic pressure medium to flow from one side of the piston to the other. A damping device is thereby obtained, which due to the supporting of the piston between the compression spring unit and the pressure disks is capable of functioning as a hydromechanical damper, which is capable of braking rapid compression springing movements of the pendular arm and preventing bottoming.

Further special features of the damping device according to the invention are specified in the following dependent claims.

The invention is described in more detail below with reference to drawings attached.

DETAILED DESCRIPTION OF PREFERRED EMBODIMENTS

Figure 1:
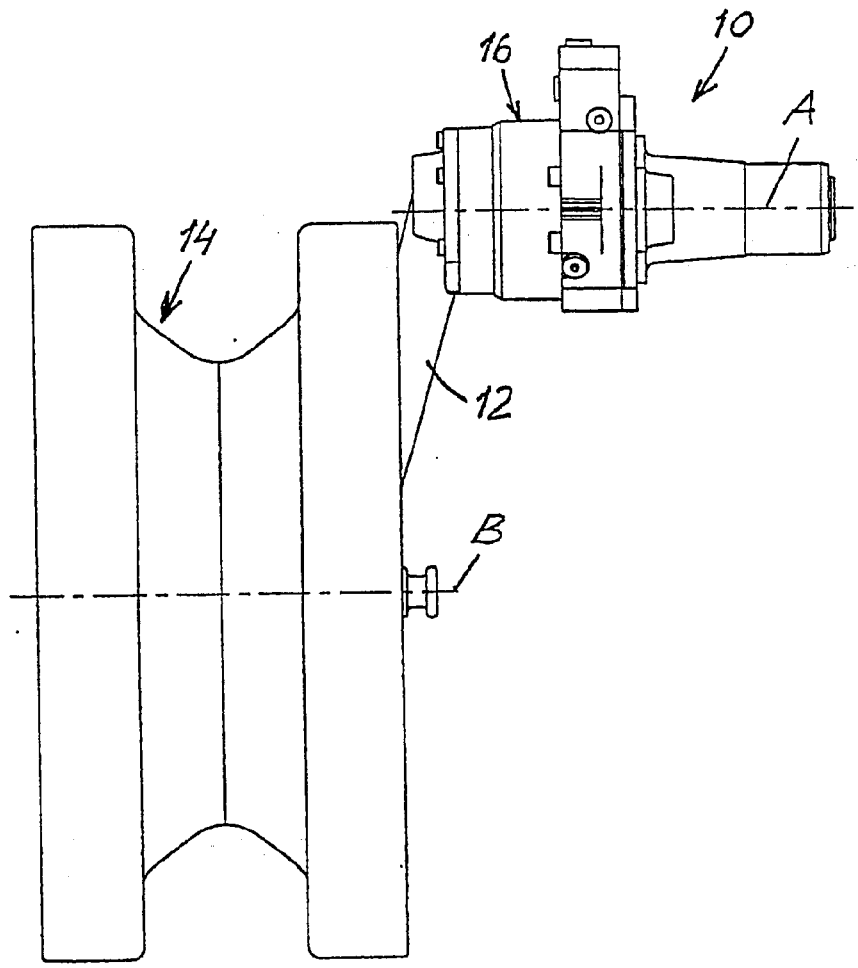
FIG. 1 is a side view of a torsion damper according to the invention for a motor vehicle wheel-supporting pendular arm pivoted therein.

FIG. 1 shows a torsion damper according to the invention, generally denoted by 10, for position and speed-dependent damping of pivotal movements of a pendular arm 12 about an axis A. At its free end the pendular arm 12 supports a carrier wheel 14, freely rotatable about an axis B and intended to bear supportively against the upper side of a lower running element of an endless caterpillar track (not shown) of a tracked motor vehicle. The damper 10 has a housing 16, which is intended to be firmly fixed in the side of a chassis part of the tracked vehicle, where a number of such carrier wheel-supporting pendular arms are pivoted in series.

Figure 2:
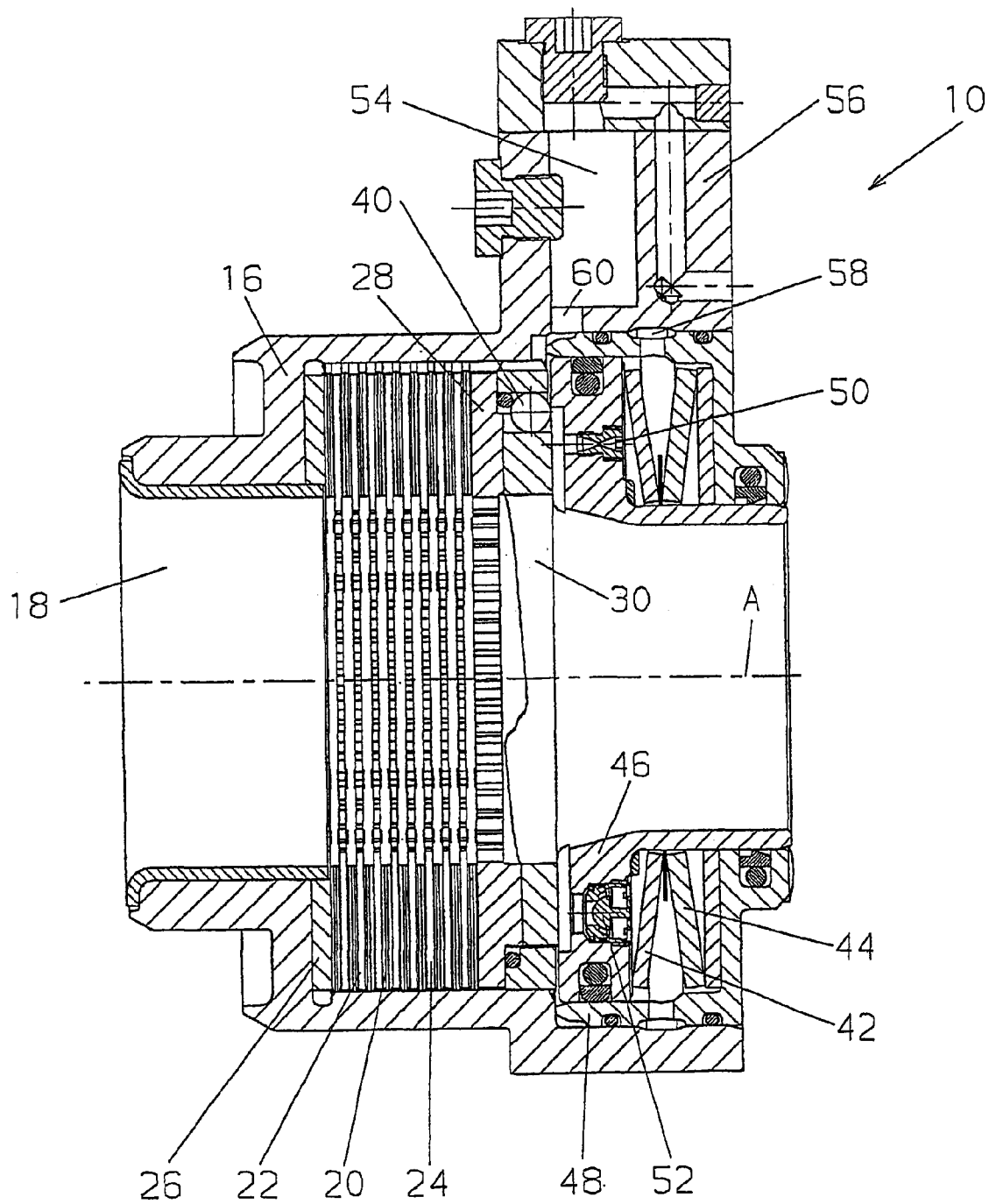
FIG. 2 is an enlarged cross-section view through the torsion damper in FIG. 1 omitting the swing axle of the pendular arm.

FIG. 2 shows in more detail how the torsion damper 10 according to the invention is constructed. The housing 16 of the torsion damper 10 has a central cavity 18 for the accommodation and rotatable support of a hollow swing axle journal (not shown) of the pendular arm 12, which is intended to be torsionally fixed to a torsion spring (not shown) in the form of a torsion bar running coaxially with the axis A. A plate pack, comprising a number of coaxially adjoining, annular disk plates 20, 22, is fitted in an enlarged cylindrical cavity 24 in the housing 16. In this, every other disk plate of the disk plates 20 is torsionally fixed but axially moveable on the axle journal of the pendular arm 12 by means of a splined connection, whilst the other intermediate disk plates 22 are torsionally fixed but axially moveable in the housing 16 by way of another splined connection. At one end the plate pack has a fixed axial stop 26 against the housing 16 and at its other end an axially moveable stop in the form of a first annular pressure disc 28, which is connected so that it is torsionally fixed but axially moveable to the shaft journal of the pendular arm by way of a splined connection. A second annular pressure disk 30 is fitted coaxially up against the first pressure disk 28 and is torsionally fixed but axially moveable in the housing 16 also by way of a splined connection.

Figure 4:
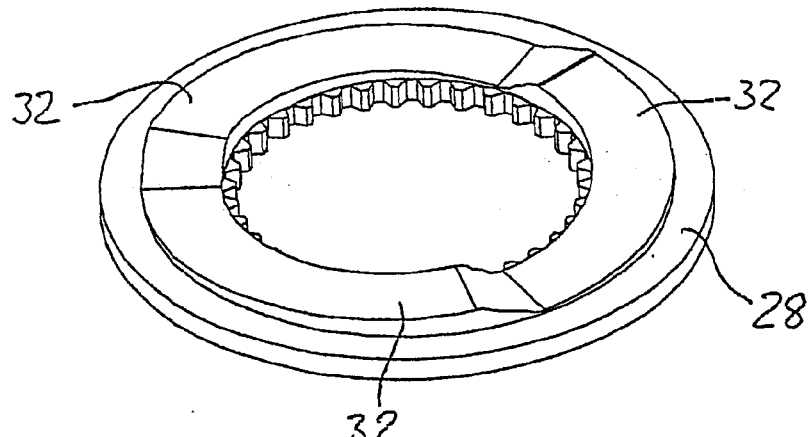
FIG. 4 is a perspective view of a first pressure disk for torsionally fixed mounting on the swing axle of the pendular arm.
Figure 5:
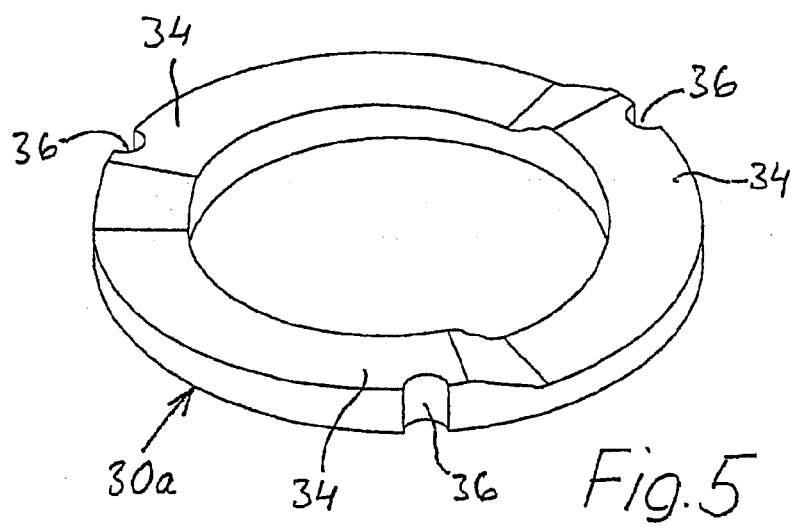
FIG. 5 is a perspective view of an inner annular part of a second pressure disk for torsionally fixed mounting in the torsion damper housing.
Figure 6:
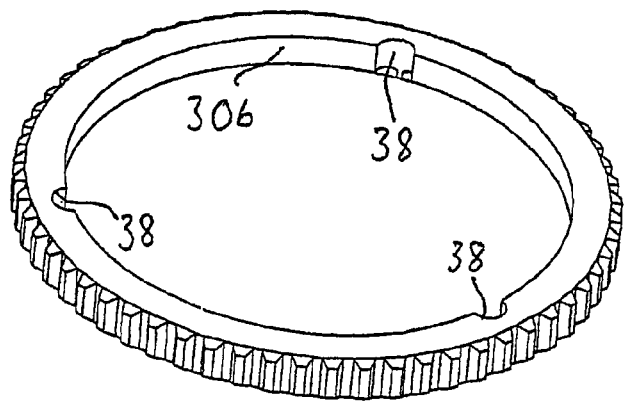
FIG. 6 is a perspective view of an outer annular part of the second pressure disk.

As shown in more detail in FIG. 4, the first pressure disk 28, on one side facing the second pressure disk 30, has three wedge-shaped cams 32 running in a circumferential direction, which are designed to interact with three complementary cams 34, formed on the opposite side of the second pressure disk 30 (FIG. 5). This second pressure disk 30, as shown in FIGS. 5 and 6, comprises an inner ring 30a with cams 34, and an outer ring 30b, the rings 30a, 30b having three interlocking recesses 36 and 38 for receiving a spherical element 40 (FIG. 2), which couples the rings together so that they are torsionally fixed but allows an axial movement in relation to one another.

Figure 3:
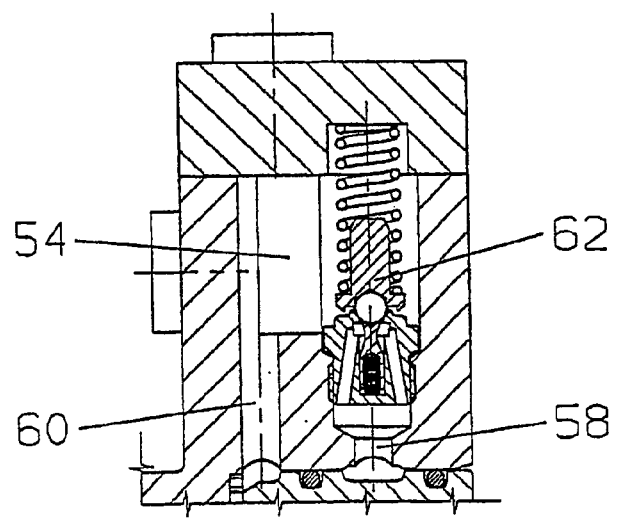
FIG. 3 is a cross-sectional view of an upper part of the housing of the torsion damper, showing a pressure relief valve fitted therein.

A compression spring unit in the form of a pair of annular disk springs 42, 44, in which one spring 44 is thicker and stiffer than the other, exerts a pretensioning force on the pressure disks 28, 30 and on disks 20, 22 of the plate pack under the action of a piston 46, which is situated between the pressure disks and the spring unit and bears against the inner ring 30a, and is axially moveable in a cylindrical part 48 in the housing 16. The piston 46 has a fixed restriction 50, which allows a hydraulic medium (oil) to flow through from one side of the piston to the other, when the piston 46 is moved axially. The piston 46 also has a return valve 52, which together with the restriction 50 permits a more rapid displacement (return movement) of the piston 46 to the left than to the right in FIG. 2, that is to say it permits a greater flow of oil from the left-hand side of the piston to the right in a return movement of the piston 46, assisted by the compression spring unit 42, 44 in the case of a return movement or extension springing of the pendular arm by means of the torsion bar. The space to the left of the piston 46 is further connected to the space to the right of the piston 46 by way of a chamber 54 in a superstructure 56 of the housing 16. Ducts 58 and 60 connect the respective sides of the piston 46 to the chamber 54. Co-ordinated with the duct 58 is a pressure relief valve 62 (FIG. 3), which is designed to open the connection between the chamber 54 and the space to the right of the piston 46 when a predetermined oil pressure in the latter chamber is exceeded, which occurs in the event of rapid compressive springing of the pendular arm 12.

Figure 8:
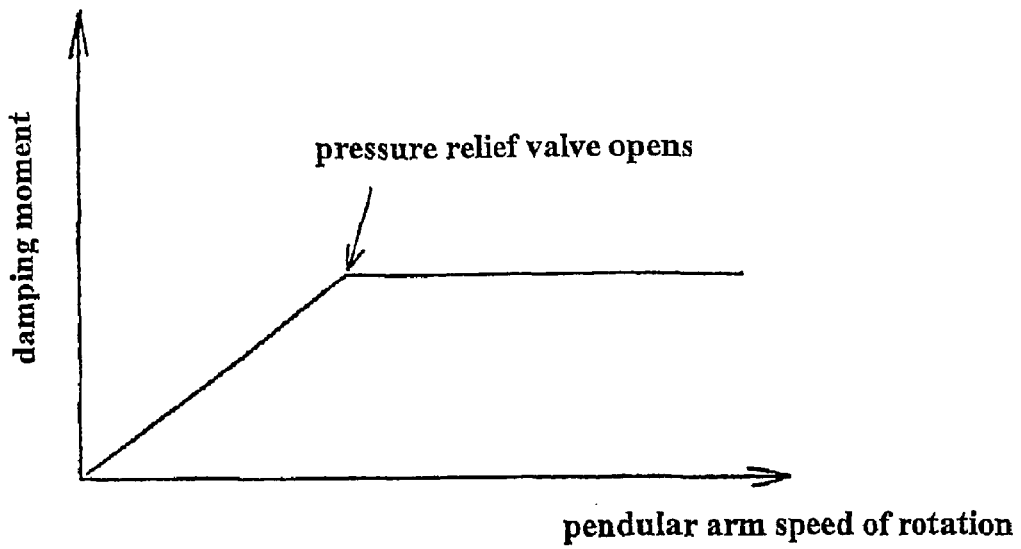
FIGS. 7 and 8 are diagrams respectively showing position and speed-dependent damping of springing movements of the pendular arm by means of a device according to the present invention.
Figure 7:
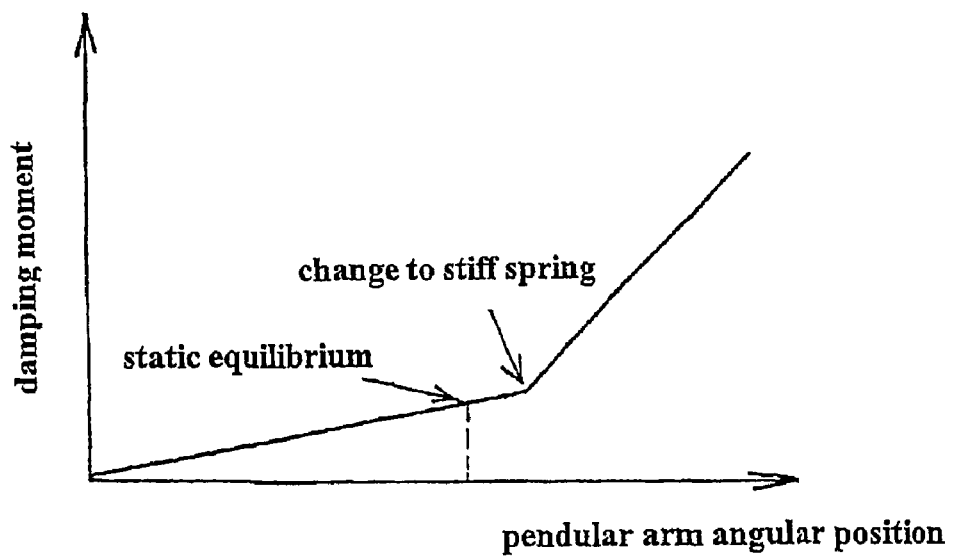

The damping device according to the invention functions as follows:

When driving a tracked vehicle the pendular arms are compressively sprung to a different degree and at differing rates depending on the irregularities of the ground and the speed of the vehicle. In the case of relatively slow compressive springing (position-dependent damping), the pendular arm 12 turns the first pressure disk 28, which then by means of the cams 32 and 34 presses the second pressure disk 30 and the piston 46 away from itself, against the action of the disk springs 42, 44, the first pressure disk 28 at the same time pressing the disk plates 20, 22 operating in oil towards one another and against the fixed stop 26 in the housing 16, so that the compressive springing of the pendular arm 12 is friction damped ever more strongly the farther the arm compresses, as shown in the graph in FIG. 7. After passing a specific angular position (compressive springing) of the pendular arm 12, in which the weaker disk spring 42 is pressed to a limit stop, the stiffer disk spring 44 is activated, a change to the steeper damping curve in FIG. 7 then occurring. At the same time oil flows from the right-hand side of the piston 46 to the left-hand side by way of the restriction 50, a speed-dependent damping moment being exerted on the pendular arm 12 in accordance with the left-hand sloping curve in FIG. 8.

In extreme off-road driving conditions, in which the pendular arm 12 is made to perform a rapid compressive springing movement in excess of a predetermined angular velocity, the pressure relief valve 62 opens due to the oil pressure increase, thereby allowing the oil on the right-hand side of the piston 46 also to flow through the valve 62 to the chamber 54 and the opposite side of the piston 46. An instantaneously dynamic pivotal damping of the pendular arm 12 is thereby achieved according to the horizontal curve in FIG. 8. In the event of rapid extension springing of the pendular arm 12 the return valve 52 opens, the oil flowing rapidly back to the right-hand side of the piston 46 by way of the return valve 52 and the fixed restriction 50.

It is also possible, without departing from the scope of the present invention, to locate the valve elements 50 and 52, like the pressure relief valve 62, in the superstructure 56 of the housing 16 rather than in front of the piston 46, making the valves more easily accessible for inspection and servicing.

Owing to the double action of the damping device with static and dynamic (position and speed-dependent) damping of the pendular arm 12 in compressive springing and position-dependent damping in extension springing, improved comfort and ride characteristics are obtained in the vehicle with a reduced risk of bottoming in the spring suspension system.

What is claimed is:

1. A device for damping pivotal movements of a wheel-supporting pendular arm (12) of a motor vehicle, the device comprising:

a housing (16) with a cavity for rotatable support of a swing axle of the pendular arm (12);

a plate pack arranged in the housing and comprising a number of coaxially adjoining, annular disk plates (20, 22), which are alternately torsionally fixed but axially moveable in the housing (16) or on the swing axle respectively;

a first annular pressure plate (28), torsionally fixed but axially moveable on the swing axle of the pendular arm;

a second annular pressure plate (30), torsionally fixed but axially moveable in the housing (16), the two pressure plates (28, 30) having opposing sides with members (32, 34) designed, on rotation of the first pressure plate (28), to produce an axial movement of the pressure plates (28, 30) in relation to one another;

a compression spring unit (42, 44), designed to exert a compressive force on the pressure plates and the disk plates;

an axially moveable piston (46) arranged between the compression spring unit (42, 44) and the pressure plates (28, 30); and a restrictor element (50, 62), which allows a hydraulic pressure medium to flow from one side of the piston (46) to the other, wherein, the second pressure plate (30) comprises an outer ring (30b), which is torsionally fixed to the housing (16), and an inner ring (30a), which is connected so that it is torsionally fixed but axially moveable to the outer ring (30b) by way of spherical elements (40), spaced in a circumferential direction and supported in axial, complementary grooves (36, 38) in the outer and inner ring (30b and 30a).

2. The device according to claim 1, wherein the restrictor element comprises a first restriction (50) in the piston (46).

3. The device according to claim 2, wherein the first restriction (50) has a fixed passage area.

4. The device according to claim 2, wherein the restrictor element comprises a second restriction in the form of a pressure relief valve (62) in the housing (16) designed to allow a hydraulic pressure medium to flow from one side of the piston (46) facing the compression spring unit (42, 44) to the other side of the piston facing the pressure plates (28, 30) when a predetermined pressure is exceeded in the pressure medium on the first aforementioned side of the piston.

5. The device according to claim 1, wherein the spring unit (42, 44) has a progressive spring characteristic.

6. The device according to claim 1, wherein the spring unit comprises annular disk spring elements (42, 44) of different thickness.

7. The device according to claim 1, wherein the members for producing an axial movement of the first and second pressure plates relative to one another consist of complementary, wedge-shaped cam elements (32, 34) on the opposing sides of the pressure plates (28, 30).

8. The device according to claim 7, wherein the inner ring (30a) of the second pressure plate is provided with the said wedge-shaped cam element (34).

9. A device for damping pivotal movements of a wheel-supporting pendular arm (12) of a motor vehicle, the device comprising:
- a housing (16) with a cavity for rotatable support of a swing axle of the pendular arm (12);
- a plate pack arranged in the housing and comprising a number of coaxially adjoining, annular disk plates (20, 22), which are alternately torsionally fixed but axially moveable in the housing (16) or on the swing axle respectively;
- a first annular pressure plate (28), torsionally fixed but axially moveable on the swing axle of the pendular arm;
- a second annular pressure plate (30), torsionally fixed but axially moveable in the housing (16),
- the two pressure plates (28, 30) having opposing sides with members (32, 34) designed, on rotation of the first pressure plate (28), to produce an axial movement of the pressure plates (28, 30) in relation to one another;
- a compression spring unit (42, 44), designed to exert a compressive force on the pressure plates and the disk plates;
- an axially moveable piston (46) arranged between the compression spring unit (42, 44) and the pressure plates (28, 30);
- a restrictor element (50, 62), which allows a hydraulic pressure medium to flow from one side of the piston (46) to the other; and
- a return valve (52) arranged in the piston (46) in order to facilitate a return flow of pressure medium from the side of the piston facing the pressure plates (28, 30) to that side thereof facing the compression spring unit (42, 44).

10. The device according to claim 9, wherein the second pressure plate (30) comprises an outer ring (30b), which is torsionally fixed to the housing (16), and an inner ring (30a), which is connected so that it is torsionally fixed but axially moveable to the outer ring (30b) by way of spherical elements (40), spaced in a circumferential direction and supported in axial, complementary grooves (36, 38) in the outer and inner ring (30b and 30a).

11. The device according to claim 9, wherein the restrictor element comprises a first restriction (50) in the piston (46).

12. The device according to claim 11, wherein the first restriction (50) has a fixed passage area.

13. The device according to claim 12, wherein the restrictor element comprises a second restriction in the form of a pressure relief valve (62) in the housing (16) designed to allow a hydraulic pressure medium to flow from one side of the piston (46) facing the compression spring unit (42, 44) to the other side of the piston facing the pressure plates (28, 30) when a predetermined pressure is exceeded in the pressure medium on the first aforementioned side of the piston.

14. The device according to claim 9, wherein the spring unit (42, 44) has a progressive spring characteristic.

15. A device for damping pivotal movements of a wheel-supporting pendular arm (12) of a motor vehicle, the device comprising:
- a housing (16) with a cavity for rotatable support of a swing axle of the pendular arm (12);
- a plate pack arranged in the housing and comprising a number of coaxially adjoining, annular disk plates (20, 22), which are alternately torsionally fixed but axially moveable in the housing (16) or on the swing axle respectively;
- a first annular pressure plate (28), torsionally fixed but axially moveable on the swing axle of the pendular arm;
- a second annular pressure plate (30), torsionally fixed but axially moveable in the housing (16),
- the two pressure plates (28, 30) having opposing sides with members (32, 34) designed, on rotation of the first pressure plate (28), to produce an axial movement of the pressure plates (28, 30) in relation to one another;
- a compression spring unit (42, 44), designed to exert a compressive force on the pressure plates and the disk plates;
- an axially moveable piston (46) arranged between the compression spring unit (42, 44) and the pressure plates (28, 30); and
- a restrictor element (50, 62), which allows a hydraulic pressure medium to flow from one side of the piston (46) to the other, said restrictor element comprising a first restriction (50), and a second restriction in the form of a pressure relief valve (62) configured to allow the hydraulic pressure medium to flow from the side of the piston (46) facing the compression spring unit (42, 44) to the other side of the piston facing the pressure plates (28, 30) when a predetermined pressure is exceeded in the pressure medium on the first aforementioned side of the piston.

16. The device according to claim 15, wherein the second restriction is mounted in the housing (16).

17. The device according to claim 15, comprising a return valve (52) for facilitating a return flow of pressure medium from the side of the piston facing the pressure plates (28, 30) to that side thereof facing the compression spring unit (42, 44).

18. The device according to claim 15, wherein the second pressure plate (30) comprises an outer ring (30b), which is torsionally fixed to the housing (16), and an inner ring (30*a*), which is connected so that it is torsionally fixed but axially moveable to the outer ring (30*b*) by way of spherical elements (40), spaced in a circumferential direction and supported in axial, complementary grooves (36, 38) in the outer and inner ring (30*b* and 30*a*).

19. The device according to claim 18, wherein the members for producing an axial movement of the first and second pressure plates relative to one another consist of complementary, wedge-shaped cam elements (32, 34) on the opposing sides of the pressure plates (28, 30).

20. The device according to claim 19, wherein the inner ring (30*a*) of the second pressure plate is provided with the said wedge-shaped cam element (34).

* * * * *